March 11, 1924.
C. F. BUFFARD
RECUPERATION CELL
Filed Sept. 9, 1922
1,486,726
2 Sheets-Sheet 1
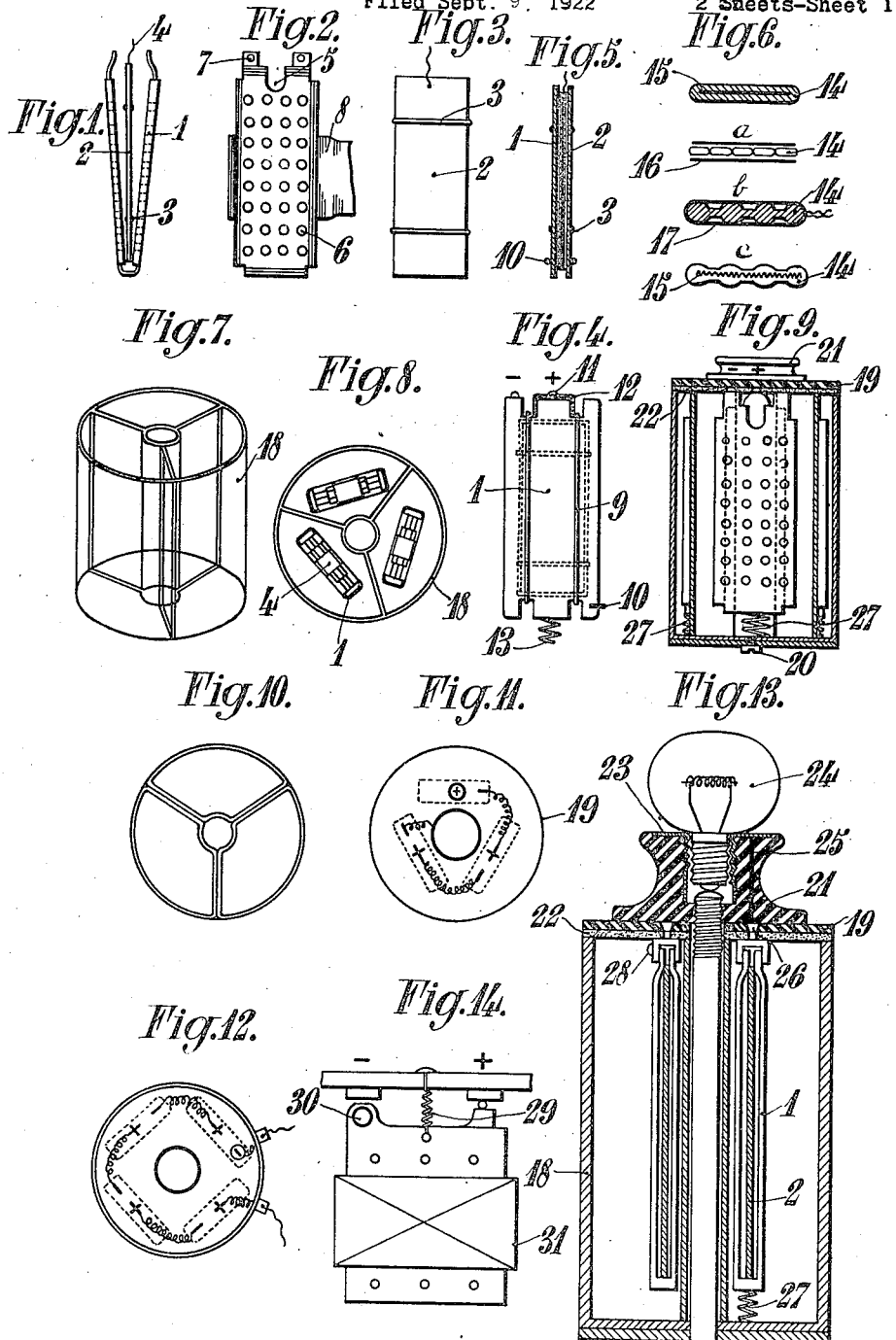
Inventor:
C. F. Buffard
By Marked Clerk
Attys March 11, 1924.

C. F. BUFFARD

RECUPERATION CELL

Filed Sept. 9, 1922

Inventor:
C.F.Buffard

Patented Mar. 11, 1924.

1,486,726

UNITED STATES PATENT OFFICE.

CHARLES FRANÇOIS BUFFARD, OF PARIS, FRANCE.

RECUPERATION CELL.

Application filed September 9, 1922. Serial No. 587,206.

*To all whom it may concern:*

Be it known that I, CHARLES FRANÇOIS BUFFARD, a citizen of the French Republic, residing at 122 Avenue de la Republique, Paris, France, have invented new and useful Improvements in a Recuperation Cell, of which the following is the specification.

Except for dynamo electric machines for the production of direct current, use is generally made of batteries or accumulators. In fact, the accumulator, with its long duration and its small fall of voltage is preferable to cells; however, it has the disadvantage of being very cumbersome and of having a considerable weight, for a rather small power. Besides, it requires attentive care in its manipulation.

On the contrary, with certain cells and particularly dry cells, the care and attention required are negligible, the weight and space occupied being moreover much less.

Unfortunately, the polarization of the cells limits their use; in fact, with the exception of standard or laboratory cells, manganese dioxide is in general employed for the depolarization, which does not allow to stock and export, when cells with solid electrolyte (which are the more practical) are considered. Besides, the fall of voltage of cells of this type is very rapid; they can be improved on this point only by combinations of electrolytes which are prejudicious to their preservation. Finally, their efficiency is very small and does not exceed $\frac{1}{3}$ of the work they should perform theoretically.

The cell forming the subject-matter of this invention is designed to overcome the above-mentioned inconveniences.

The rate of discharge of the improved cell is nearly constant, thus rendering the cell specially desirable for electric lighting purposes. On the other hand, its weight and the space it occupies are very reduced; and finally, it can be charged at any moment without addition of any chemical, and the charges may be preserved indefinitely.

The cell is substantially constituted by a zinc electrode and a silver chloride electrode, in the manner already known. On the other hand, it is known that it is possible to regenerate silver chloride.

The invention essentially consists in the means used for allowing the manufacturer to retake the spent cell with the assurance of finding therein all the silver it initially contained; in this manner, aside from the small cost of the electrolyte, all that is required to produce current is to effect a chemical transformation of a metal into salt, the quantity of metal remaining constant. Notwithstanding the use of a precious metal, a new economical result is thus obtained.

Other features of the invention consist in the arrangements adopted for automatically connecting in series the cells of one and the same battery and finally in the means used for separating the electrodes and arranging the electrolyte in each cell, so that the cell can be charged simply by filling it up with water.

In the accompanying drawing wherein an approved embodiment of the invention is illustrated:

Fig. 1 is an edge elevation of a cell partially assembled;

Fig. 2 is a side elevation thereof;

Fig. 3 is a side elevation of the silver chloride tablets removed;

Fig. 4 is a side elevation of a slightly modified type of cell;

Fig. 5 is a vertical sectional view of the modified type of cell;

Figure 15:
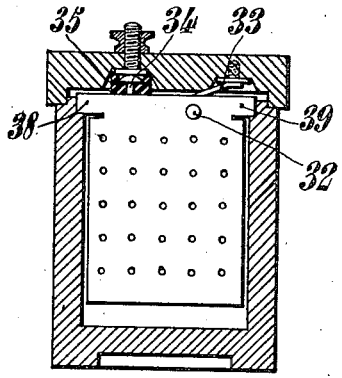
Figure 16:
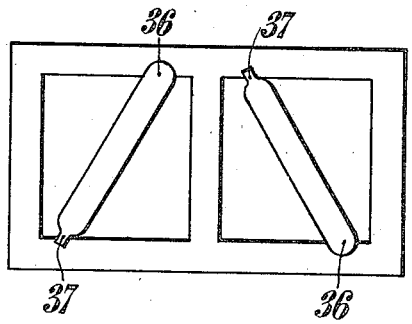
Figure 17:
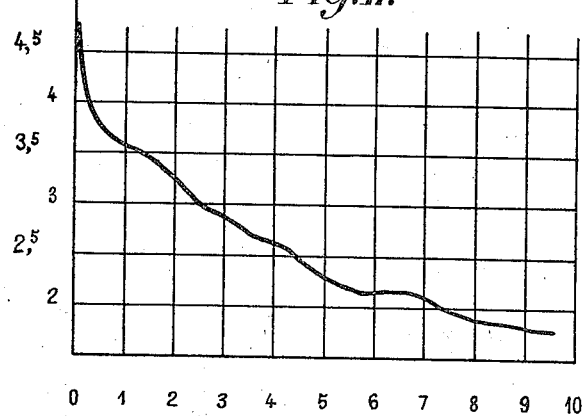
Figure 18:
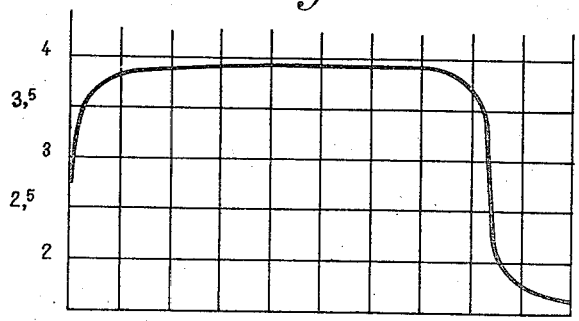

Figs. 6, 6ª, 6ᵇ and 6ᶜ are detail sectional views through modified types of silver chloride tablets;

Fig. 7 is a perspective view of a multiple cell vessel, the electrodes being removed;

Fig. 8 is a top plan view of a battery composed of three cells, the cover of the vessel being removed;

Fig. 9 is a vertical sectional view through a complete battery of the type illustrated in Fig. 8, the cover of the vessel and the clamping bolt therefor being shown;

Fig. 10 is a top plan view of a modified type of cell vessel;

Fig. 11 is a top plan view of a three cell battery showing the manner of connecting the electrodes in series;

Fig. 12 is a plan view similar to Fig. 11 showing a four cell battery;

Fig. 13 is a vertical sectional view similar to Fig. 9 showing a modification of the clamping device for the cover of the cell vessel;

Fig. 15 is a vertical sectional view through a further modification of a battery constructed in accordance with the invention;

Fig. 16 is a top plan view of the modified type of battery illustrated in Fig. 15, the cover of the cell vessel being removed;

Fig. 17 is a diagram indicating the discharge curve of a dry battery composed of three manganese dioxide cells; and, Fig. 18 is a similar diagram showing the discharge curve of a battery constructed in accordance with the present invention.

Each of the cells is constituted by a small zinc plate forming a soluble anode, enclosing a silver chloride tablet from which it is separated by a diaphragm.

Referring to the drawing in detail, the cell is constituted by a zinc casing 1 in one piece, curved and pressed, containing a silver chloride tablet 2 insulated from the zinc element 1 by rings 3.

The soluble anodes, in this example, are provided with a cut away part 5 permitting the passage with guarantee of the wire 4 extending from the positive pole. The zinc plates are perforated with holes 6 facilitating the circulation of the electrolyte and they can be provided with holes 7 for the connection of the negative pole of an adjacent cell.

It will be understood that the insulating rings 3 may be replaced by a paper or fabric wrapper forming a diaphragm and insulating material.

Generally speaking all the tablets delivered for use will always be provided with a guarantee strip, either fastened by a rivet or by any other suitable means impervious to the chemical action of electrolytes and assuring, when repurchasing the cell, that the latter still contains the weight of silver originally introduced in the form of metal or chloride.

The zinc plates have a sufficient thickness so that they are not cut during the operation of the cell.

Referring to Figs. 4 and 5 the two zinc elements 1 are formed of small independent plates held in the required position on the cathode 2 by the extensible outer bands or rings 9. The two plates 1 are connected together by the zinc connection 10 and the positive pole 11 is wrapped in an insulating material 12.

In the various forms of tablets illustrated in Figs. 6, 6$^a$, 6$^b$ and 6$^c$, 14 is the melted chloride, the conductibility of which is increased by perforated, smooth or waved inner cores 15, of native silver, which are connected to the positive pole.

The chloride can also be enclosed in silver paper 16, Fig. 6$^a$, or surrounded by a wire 17, Fig. 6$^b$, of the same metal.

A vessel 18, Figs. 7, 8 and 9, with 3 cells forming a single block is provided which is closed by clamping the cover 19 by means of the rod 20 and nut 21, a compression joint 22 being provided between the vessel and the cover.

This vessel can be made of any insulating materials and as shown in Fig. 10, it can also be constituted by a plurality of sections secured in position.

From Figs. 11 and 12 it may be seen how the number of cells may be varied, the connections for connecting them in series being arranged in the covers which will always be made of insulating material.

The battery illustrated in Fig. 13 is connected in the same manner as that of Fig. 9 but the clamping nut 21 is also made of insulating material. Whether it is used for mounting the lamp 24 in the metal socket 23, or if it is used as a simple switch, it is possible without reducing the effectiveness of the joint 22, to turn it a few degrees. Incident to turning the nut the conducting connection 25 which is connected with the socket 23 is disengaged from the contact 26 on the contact piece connected to the tablet and the circuit is thus opened.

The cells are either brought in contact with the connections of the covers by the thrust of the springs 27, or they may be secured in the holders 28.

In Fig. 14, the tablet is pulled upwardly to make contact by a contractible spring 29. A guarantee seal 30 closes the tablet which is here enclosed in a spongy wrapper 31 permitting the use with the minimum of loose liquid.

The various electrolytes can be poured in the cells, but it is preferable to impregnate the diaphragms or absorption strips 31 with the salts chosen.

It then suffices to charge the cells solely with water. The solution becomes conductive in a few minutes and the cell forms itself.

In the two-cell battery illustrated in Figs. 15 and 16, each of the said cells is constituted as follows: A zinc anode entirely surrounds the silver chloride cathode from which it is separated by a diaphragm; a guarantee rivet 32 connects the ends of the anode, preventing its being opened for fraudulently removing the silver chloride. The connections are effected by means of a blade spring 33 connected to a zinc anode and a contact piece 34 passing through a rubber tube 35, forming a spring, connected to the cathode by means of a conductor which can be insulated.

On the other hand, the jar is provided with notches 36—37 corresponding to the tenons 38—39 of the zinc plates which are not of the same shape at each end. In this manner, the cells are compulsorily properly placed in the jar, this allowing the cover, which is provided with the connections in series, to correctly make the contacts.

The diagram Fig. 17 by way of comparsion shows approximately the discharge curve of a dry battery of three manganese dioxide cells.

The hours are shown in abscissæ and the volts in ordinates.

The diagram Fig. 18 shows the discharge curve of a battery of four silver chloride cells constructed in accordance with the present invention.

Particularly for portable lighting purposes, the invention solves the problem considering the constancy of the discharge curve and the working efficiency of the cell. Although this cell utilizes a precious metal and its salt, yet by means of a repurchasing or maintenance service, it will be possible to produce light cheaper than with dry cells and if the prices and luminous intensities were compared, the chloride cell proves to be from 20 to 30 times more economical.

The curve of Fig. 18 shows the formation of the cell before its constant working then its rapid fall.

The tablets may be indefinitely preserved and their use will permit to immediately have current for any applications and under any latitudes.

What I claim as my invention and desire to secure by Letters Patent is:

1. In a recuperation cell, a silver chloride electrode, a diaphragm enclosing this electrode, a zinc eletrode surrounding the silver chloride electrode, perforations in the said zinc electrode, means for controlling the opening of the zinc elctrode.

2. In a recuperation cell, a silver chloride electrode, a diaphragm enclosing this electrode, a zinc electrode surrounding the silver chloride electrode, perforations in the said zinc electrode, a rivet ensuring the closing of the zinc electrode.

3. In a recuperation cell, a silver chloride electrode, a diaphragm enclosing this electrode, a zinc electrode surrounding the silver chloride elctrode, perforations in the said zinc electrode, means for incorporating the electrolyte to the separating diaphragm, a jar of insulating material, contacts resiliently mounted on the electrodes, blades arranged on the cover, nonsimilar tenons on the zinc electrodes, corresponding mortices on the jars.

4. In a recuperation cell, a silver chloride electrode, a diaphragm enclosing this electrode, a zinc electrode surrounding the silver chloride electrode, perforations in the said zinc electrode, means for incorporating the electrolyte to the separating diaphragm, a jar of insulating material, contacts resiliently mounted on the elctrodes, blades arranged on the cover, nonsimilar tenons on the zinc electrodes, corresponding mortices on the jars, partitions dividing the jars in multiple compartments each receiving a cell.

In testimony whereof I have signed my name to this specification.

CHARLES FRANÇOIS BUFFARD.